(No Model.)
C. LA DOW.
HARROW.
No. 451,422. Patented Apr. 28, 1891.
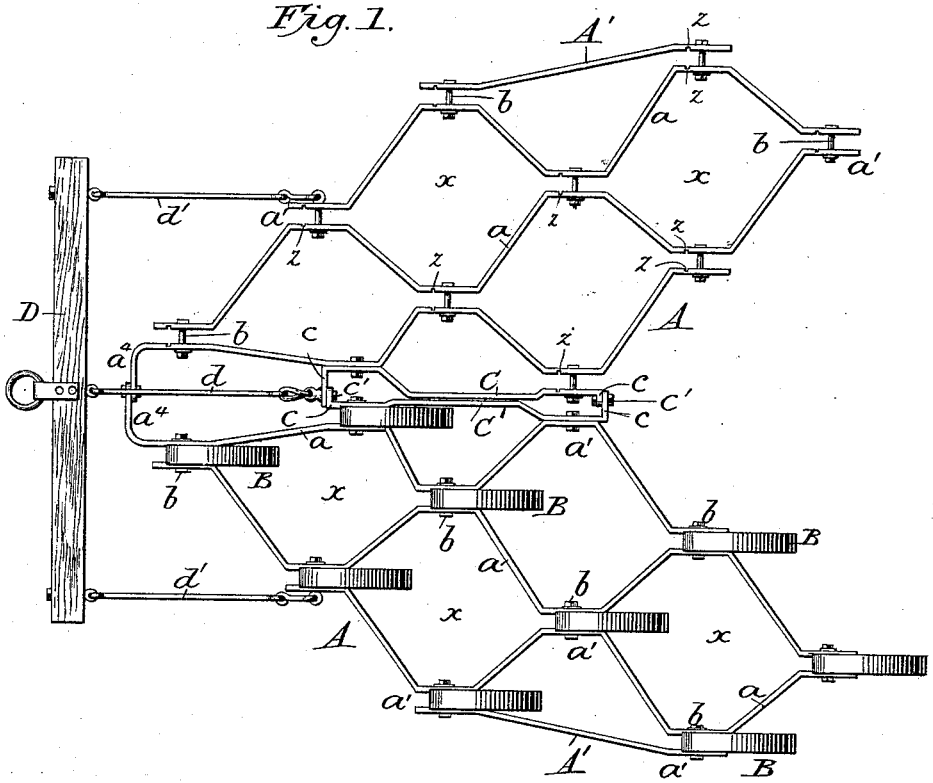
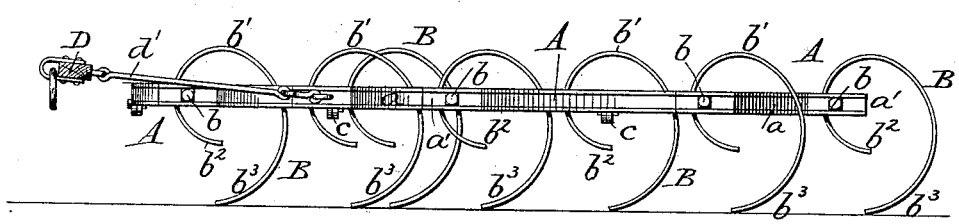
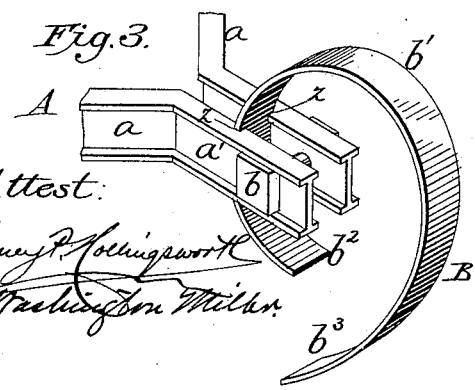
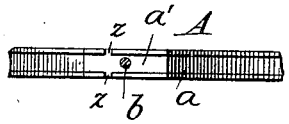
Attest:
Sidney P. Hollingsworth
B. Washington Miller
Inventor:
CHARLES LA DOW
by his attorneys.
Baldwin Davidson & Wight
THE NORRIS PETERS CO., PHOTO-LITHO., WASHINGTON, D. C.

UNITED STATES PATENT OFFICE.

CHARLES LA DOW, OF ALBANY, NEW YORK.

HARROW.

SPECIFICATION forming part of Letters Patent No. 451,422, dated April 28, 1891.

Original application filed May 9, 1889, Serial No. 310,088. Divided and this application filed March 31, 1891. Serial No. 387,143. (No model.)

*To all whom it may concern:*

Be it known that I, CHARLES LA DOW, a citizen of the United States, residing at Albany, in the county of Albany and State of New York, have invented certain new and useful Improvements in Harrows, of which the following is a specification.

My invention particularly relates to float-harrows in which curved spring-teeth are adjustably secured to metallic frame-bars.

The frame in my harrow is formed in two hinged sections, each composed of horizontal zigzag bars rigidly secured together. A series of transverse rows of individually-adjustable spring-teeth is arranged at adjacent longitudinal portions of the frame-bars, and runners extend below the longitudinal portions of the frame. Draft-links are employed adapted to haul the harrow from three points, so as to cause the frame to run level.

One specific way of carrying out my invention is as follows: The frame is composed of two hinged sections, each section composed of rigidly-connected zigzag channel-iron bars arranged in the same horizontal plane with longitudinal openings between adjacent longitudinal portions of different bars, and spring-teeth of the Garver type are adjustably secured between their adjacent portions. The teeth extend above and behind the longitudinal openings, and their curved inner ends or shanks are extended beneath the frame to form runners to raise the openings above the ground to prevent the entrance thereto of rocks, stumps, and other clogging matter, which would tend to spread apart or distort the frame-bars. The teeth are adjustable about smooth-faced seats located at adjacent portions of the bars, and transverse bolts are employed for holding the teeth by friction.

The details of construction will be hereinafter more fully described, and the subject-matter deemed novel is set forth in the claims.

In the accompanying drawings, Figure 1 is a plan view with the teeth in one-half of the harrow removed. Fig. 2 is a side elevation thereof. Fig. 3 is a detail view in perspective, showing more clearly the manner of attaching the teeth to the frame. Fig. 4 is a detail side view also showing the manner of connecting the teeth with the frame.

I will now describe the harrow specifically as shown in the drawings; but I wish it understood that I do not limit myself to the details of construction shown and described.

In general outline the harrow shown is somewhat heart or V shaped, and consists of two side sections A, hinged together. Each section is composed of rigidly-connected bars $a$, staggered or of zigzag shape and arranged in the same horizontal plane. At the angles or bends of the bars, as well as at their ends, there are portions $a'$, which are shown as parallel, or substantially so, with the draft-line, and such portions of each bar are adjacent or contiguous to similar portions of another bar; but longitudinal openings are left between them at or between the faces of such adjacent portions. The teeth B are held or clamped by the bolts $b$, that also unite the frame-bars. Each side section A is in this instance shown as composed of three staggered or zigzag bars $a$, and a straighter outside bar A', and when assembled as shown they are so related to each other as to leave openings $x$ between them.

The teeth B are shown as of the well-known Garver type, as these are preferred. They are arranged with their rear ends behind the longitudinal openings in the frame and their upper curved portions $b'$ above the upper plane of the harrow-frame. The shanks $b^2$ extend downwardly below the adjacent portions $a'$ of the frame-bars, and the lower ends of the shanks are extended a sufficient distance below the frame to form runners in advance of the working ends or points $b^3$ of the teeth, but on a higher horizontal plane. The extended shanks of the teeth which form the runners raise the longitudinal openings between the frame-bars and prevent the entrance thereto of stumps, rocks, &c., which might otherwise enter and fill the openings and tend to spread the frame-bars apart.

One way of attaching the teeth to the frame-bars is to form notches $z$ in the flanges, both at top and bottom of the bars, and to seat the teeth therein, and then clamp the bars together by the horizontal or transverse bolts $b$. When the bolts are tightened, the teeth are firmly held in working position and will not slip. By loosening the bolts the teeth may be adjusted as desired. It will be observed that there are smooth-faced seats located at adjacent portions of the bars, and that transverse bolts are employed for holding the teeth by friction.

The runners serve to float the harrow-frame as well as gage the depth of cut and lift the longitudinal openings above the ground. Being located at the adjacent parts of the frame-bars, where the teeth are attached, they support the frame at the parts where there is the most weight or strain and where there is the most liability of clogging. In the construction shown in the drawings the runners are adjustable simultaneously with the teeth.

At the inner edge of each section of the frame a short longitudinal bar C is bolted. Both of them have at front and rear lateral inward projections $c$, overlapping each other and bolted together by horizontal hinge-bolts $c'$, and upon the hinge thus formed the harrow may be folded for transportation. The front ends $a^4$ of the inner zigzag bars $a$ of each frame may be extended, overlapped, and united, as shown, by a hinge-bolt in the same line with the bolt $c'$.

The central draft-rod $d$, connected with the center of the whiffletree D, is preferably connected with the front overlapping ends $c$ of the bars C, while the outer draft-rods $d'$ are connected with the bolt $b$, which connects the front end of the outer frame-bar with the first angle or bend of the middle bar, and all three of these connections are preferably in the same transverse line; but the precise way of connecting the draft-links to the harrow-frame may be varied, it being important only that the harrow should be hauled from three points, as I have found that by so doing the frame may be made to always run level with the ground, and any tendency of the frame to rise from the ground in the central draft-line is avoided.

It will be observed that my harrow is a float-harrow composed of two hinged sections, and that the frame-bars in each section are rigidly secured together and have longitudinal portions arranged in line with the draft; that bends in said bars extend rearwardly and sidewise from said longitudinal portions and are connected with other longitudinal portions of the same bars, and that spring-teeth are connected to the frame-bars and are adjustable about smooth-faced seats located at adjacent portions of the bars, and transverse bolts are employed for holding the teeth by friction. So far as I am aware, I am the first to construct a harrow embodying these features. Obviously, however, changes in the general organization and the details of construction may be made without departing from the novel features of my invention.

I claim as my invention—

1. A sectional float-harrow having horizontal zigzag bars, with the bars in each section rigidly secured together, a series of transverse rows of individually-adjustable spring-teeth arranged at adjacent longitudinal portions of the frame-bars, and with runners below the longitudinal portions thereof.

2. The combination, in a sectional float-harrow, of a frame composed of horizontal zigzag bars, with all the bars in each section rigidly connected together, and having adjacent longitudinal portions in line with the draft at the angles or bends of the bars, and curved spring-teeth adjustably connected to the longitudinal portions of the frame-bars, with runners extending below the longitudinal openings between the bars to raise them above the ground.

3. In a sectional float-harrow, frame-bars, all of which in each section are rigidly connected together, and having longitudinal portions arranged in line with the draft, with bends in said bars extending rearwardly and sidewise from said longitudinal portions to and connected with other longitudinal portions of the same bars, spring-teeth adjustable about smooth-faced seats located at adjacent portions of the bars, and transverse bolts for holding the teeth by friction.

In testimony whereof I have hereunto subscribed my name.

CHARLES LA DOW.

Witnesses:
LLOYD B. WIGHT,
B. W. MILLER.